(12) United States Patent
Hui

(10) Patent No.: US 8,277,621 B2
(45) Date of Patent: Oct. 2, 2012

(54) HALOGEN GENERATOR FOR ABOVE GROUND POOLS

(75) Inventor: Wing-kin Hui, Hong Kong (HK)

(73) Assignee: Time Asia International Creation Limited, Hong Kong (HK)

( * ) Notice: Subject to any disclaimer, the term of this patent is extended or adjusted under 35 U.S.C. 154(b) by 0 days.

(21) Appl. No.: 12/551,185

(22) Filed: Aug. 31, 2009

(65) Prior Publication Data

US 2011/0253528 A1 Oct. 20, 2011

(51) Int. Cl.
*C25B 1/24* (2006.01)
*C25B 9/02* (2006.01)
*C25B 9/06* (2006.01)
*C02F 1/461* (2006.01)

(52) U.S. Cl. ..................................... 204/278.5
(58) Field of Classification Search .................. None
See application file for complete search history.

(56) References Cited

U.S. PATENT DOCUMENTS

| | | | | | |
|---|---|---|---|---|---|
| 3,941,349 | A | * | 3/1976 | Pierson | 251/100 |
| 3,945,604 | A | * | 3/1976 | Clarkson | 251/174 |
| 3,991,742 | A | * | 11/1976 | Gerber | 126/563 |
| 4,411,759 | A | * | 10/1983 | Olivier | 204/260 |
| 2005/0029118 | A1 | * | 2/2005 | Holstein et al. | 205/618 |
| 2005/0077190 | A1 | * | 4/2005 | Djordjevic | 205/705 |
| 2006/0113256 | A1 | * | 6/2006 | Birkbeck | 210/748 |
| 2006/0249400 | A1 | * | 11/2006 | Bremauer | 205/743 |
| 2007/0181439 | A1 | * | 8/2007 | Wu et al. | 205/620 |
| 2008/0314762 | A1 | * | 12/2008 | Jones et al. | 205/687 |

* cited by examiner

*Primary Examiner* — Harry D Wilkins, III
(74) *Attorney, Agent, or Firm* — Peninsula IP Group; Douglas Chaikin

(57) ABSTRACT

Disclosed herein is an improved electrolytic cell. The cell includes at least one pair of electrodes, an anode and a cathode. In general the anode includes at least one dimension, which is substantially greater than the cathode. In an exemplary embodiment, the length and the width of the anode are greater than the length and width of the cathode. In a first embodiment of a multi-cell chlorine generator, unequal dimension electrodes are stacked together. In a second embodiment of such a generator, the electrodes are of equal dimensions. In another exemplary embodiment of the improved electrolytic cell in accordance with this invention, the cathode forms a U-shaped member and the anode of at least one dimension being greater is located there between. Another embodiment of the chlorine generator includes at least two cells having the U-shaped cathode. In a first exemplary of embodiment of such a chlorine generator, the electrode are parallel to one another. In a second such exemplary embodiment, the electrodes are parallel and are coincident in plane with one another, respectively.

3 Claims, 4 Drawing Sheets

HALOGEN GENERATOR FOR ABOVE GROUND POOLS

RELATED PATENT APPLICATIONS

This application is relates to three other of Applicant's filings, which are filed concurrently with this application. Those filings are Ser. No. 12/551,211, Ser. No. 12/551,098 and Ser. No. 12/551,127. Additionally, each of those applications is specifically incorporated in full in this application, as if they were word for word written here. They are incorporated in full for all purposes.

FIELD OF THE INVENTION

This invention generally relates to the field of automated pool products. More particularly, this invention relates to halogen generators, including chlorinators for cleaning and making swimming pool water safe.

BACKGROUND OF THE INVENTION

Chlorine or halogen ion generation for a swimming pool has long been known as being useful for healthful and safe swimming. For example, chlorine mixed water is required of most municipal and public swimming pools in the United States and Canada. The chlorine level must be carefully regulated and adjusted if necessary in such public swimming pools to provide swimmers, including small children with a safe and healthful place to bath and swim.

Manual methods of adding chlorine to the swimming water are well known. The pool attendant take precautions to not get the chlorine directly on him/herself and then adds the proper amounts to the pool water. Various tests are done to the pool water to see ensure the proper concentration levels of chlorine are present. It is also well known that other halogen elements are used to treat pool water. For example, bromine, is also used in a similar to chlorine for safely cleaning pool water.

For many years, automated chlorinators have been known. The known automated chlorinators include means for testing the pool water to determine whether or not the appropriate level of chlorine or other halogen mixed in the water is present. For example, generally speaking, the testers look for levels of 2700 ppm. When the level drops below that level the automated chlorinator is activated and adds chlorine or other halogen to the water, increasing the level until the 2700 ppm is reached.

These chlorinators can be very expensive. For example, a common automated chlorinator can cost the consumer upwards of several thousands of dollars. Additionally, these expensive chlorinators are somewhat fragile and often need expensive repairs or even replacement.

U.S. Pat. No. 7,014,753 entitled Salt Chlorine Generator is specifically incorporated herein for all purposes, including, but not limited to it use as Background, antecedent basis and as a reference and an example of previously known devices. One of the inventors therein, then known as Joseph Hui, is the inventor herein.

At the heart of the modern automated chlorinator is an electrolytic cell. A typical such cell includes two electrodes, an anode and a cathode in a salt solution as described above with respect to the '753 patent. Once electrical power is applied to the electrodes, a chemical reaction begins. In a salt (NaCl) solution, the Cl is stripped out and floats freely in the water, safely cleaning the pool water.

Above Ground Pool:

Unlike "in-ground" pools, above ground pools, there are few adaptations for installation of halogen generators or chlorinators. One reason is because such generators tend to be quite expensive and dramatically increase the cost of such a pool; whereas, even installation of an expensive halogen generator or chlorinator would not significantly increase the cost of an in-ground pool. Thus, almost all above ground pools are devoid of such cleaning and safety devices, as halogen generators or chlorinators.

What is needed is an inexpensive automated chlorinator, which does not require dramatically increase the cost of such an above ground pool, but works effectively and allows easy repair and replacement of the device as needed.

SUMMARY OF THE INVENTION

The structure of halogen generating device in accordance with the present invention, is a housing having an intake connected to the conduit for delivering water into the pool. The housing also having an outlet connected to the pool interior. When water flows through the conduit, it goes through the intake and through the housing and the outlet filling up the pool. The housing includes an halogen generator. In close proximity to the intake, the housing includes a shunt. The shunt is slideable and allows water to enter and or be blocked from entering the housing.

Thus, It is an object of this invention is to provide a halogen generating device attachable to an above ground pool, which is affordable and which does not dramatically increase the costs of the pool.

It is another object of this invention to provide such a halogen generating device, which has multiple electrolytic cells.

It s an additional object of this invention to provide such a halogen generating device, which has means for selectively opening water flow through the housing and closing the same.

In one embodiment, the housing has a hollow space and an intake connected to a garden hose or the like for filling up above ground pool. The intake includes a sub-housing for the shunt. The sub-housing has internal rails for slideable connection with the shunt. The shunt selectively opens or blocks the flow through of water into the housing. Within the hollow space of the housing, there is a space designated for an electrolytic cell. Upon sliding the shunt to an open position, water mixes with the electrolytic cell. When electricity is applied to the electrolytic cell, halogen ions are produced in the water of the housing. Upon continued flow of the water, the halogen rich water exits the housing and flows into the pool, increasing the halogen ion content in the pool water.

Another exemplary embodiment in accordance with the invention, includes the electrolytic cell having two electrodes, the cathode being U-shaped and an anode, between the U-shaped walls. The module holds the cells in place. Each of the electrodes has an end and an electrically conductive end cap is applied over the electrode end. The module has an end plate with openings for accepting the end caps and forming a pre-defined pattern. The combination of the end caps and the end plate defining a plug for electrical connection to an electrical conduit.

In another exemplary embodiment of the electrolytic cell in accordance with the invention, the cathode forms a U-shaped configuration and the anode fits between the side walls.

In other exemplary embodiments, at least one of the electrodes is made from a semi-conductor material. One such material is titanium. In another exemplary embodiment, at least one electrode is coated with corrosion resistant material, for example, platinum or palladium.

In accordance with the objects set forth above and as will be described more fully below, the halogen generating device for an above ground pool, comprises:

a housing for placement between the means for filing the filling the above ground pool, the housing having an intake and an outlet, the outlet connected to the pool;

the housing including a shunt means for blocking water flow from the intake to the outlet;

the housing including a halogen generating module and a compartment within the housing for storing the halogen generating module.

In another exemplary embodiment, the space between cells is greater than the space between electrode plates. It has been found where the plates form the electrodes that short circuit is discouraged by such a configuration.

In accordance with the objects set forth above and as will be described more fully below, the halogen generating device having an improved electrolytic cell for an above ground pool, the electrolytic cell of the halogen generating device, comprises a halogen generating module including an electrolytic cell having two electrodes, an anode and a cathode for generating halogen in an electrolytic solution, including:

a frame having a base and engagement members, the engagement members for securing the electrodes to the frame and the end plate having openings for the electrodes;

at least one electrolytic cell including two electrodes, an anode and a cathode, each electrode end having an electrically conductive end cap, the end cap sized and shaped for insertion through the end plate opening;

upon assembly, the combination of the end caps and end plate defining an electrically conductive plug.

It is an advantage of the halogen generating device in accordance with this invention to be attached to an above ground pool, without dramatically affecting the total cost of the pool.

It is an additional advantage of the device of the instant invention to provide a the halogen generating device, which is capable of being serviced without affecting the installation of the halogen generating device attached to the above ground pool.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

In order to appreciate the invention herein, one must appreciate the need in the art as set forth in the Background. Most importantly, the structure herein for resolving the long felt need to increase the efficiency and durability in the area of pool cleaning devices, such as pool chlorinators are represented by the structure in accordance with the disclosed invention. Finally, the halogen generating device must be easily able to be installed on an above ground pool and the cost of the device and installation must be such that the overall cost of the pool is not dramatically increased.

Figure 1:
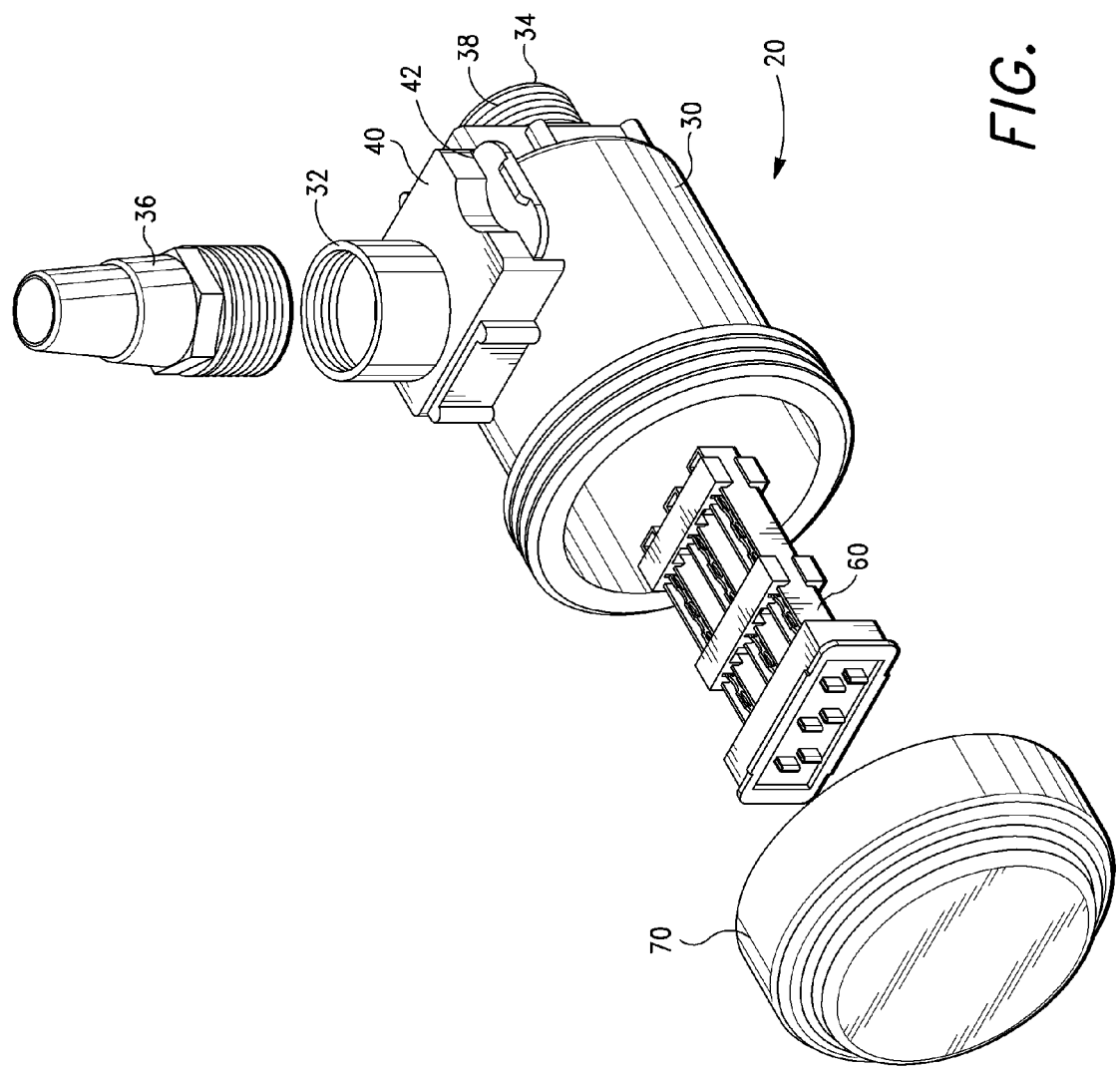
FIG. 1 is an exploded perspective view of the halogen generating device for an above ground pool, in accordance with this invention, having an electrolytic cell.
Figure 2:
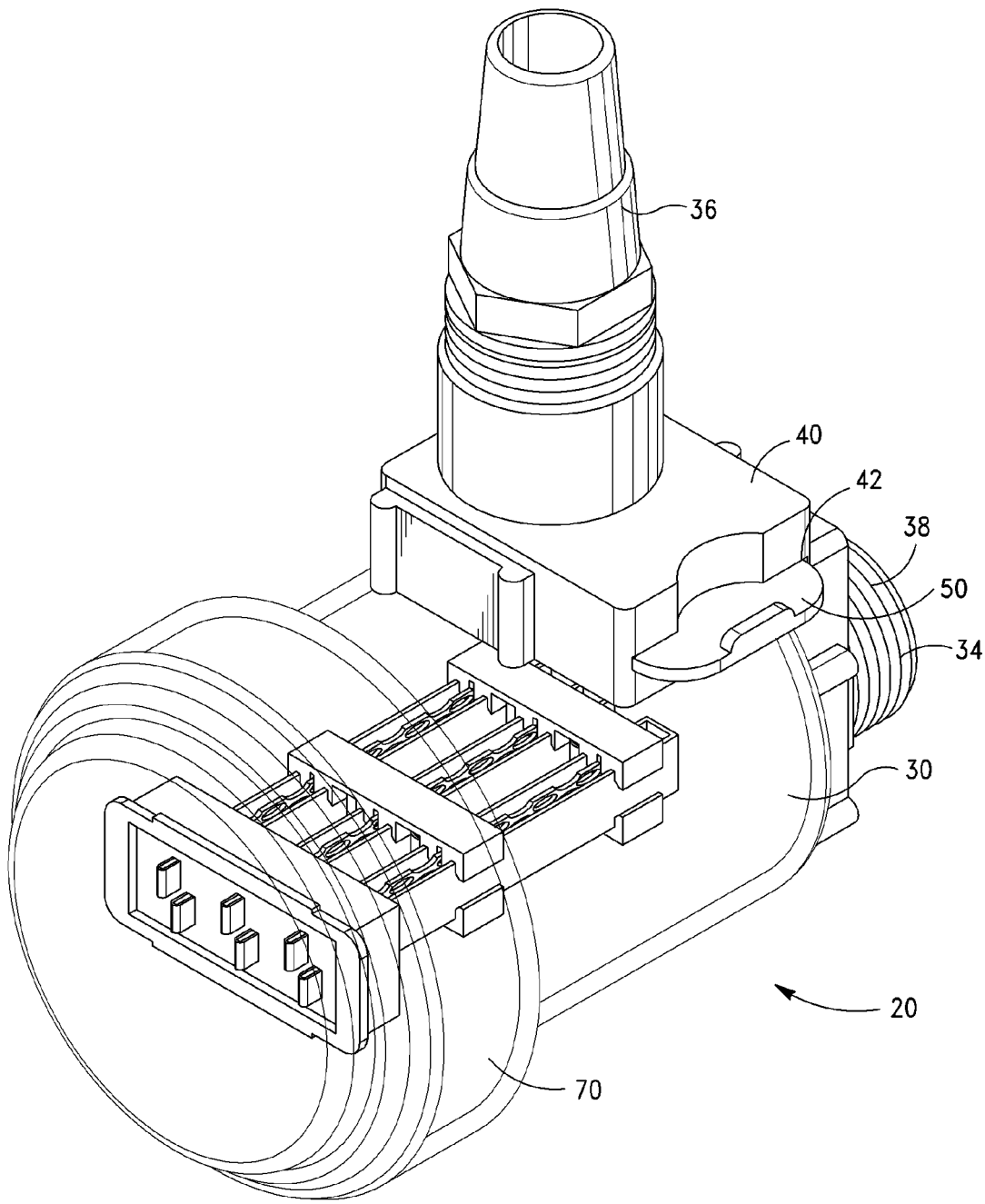
FIG. 2 is an assembled view of the halogen generating device for an above ground pool of FIG. 1.

An exemplary embodiment of the halogen ion generator 20 is illustrated in FIGS. 1 & 2. The generator 20 includes a housing 30 having a generally hollow interior and an intake 32 and an outlet 34. A nozzle 36 screws into the end of intake 32. The nozzle 36 facilitates connections with the hose of other conduit for filling the pool and controlling the water supply to the pool.

Similarly, the outlet 34 of the housing 30 has a screw end 38 which is adapted for screw connection with the above ground pool (not shown). The screw end 38 is readily adapted to fit any type of above ground intake. As will be appreciate by those familiar and skilled in the art, an above ground pool requires an intake for filling and typically a screw end is used. In using such an end, the entire halogen generator is readily adapted to connect with the above ground pool. No special tools or the like are needed. The installer may be a person of limited mechanical skills and have even less knowledge about the detailed mechanical functioning of an above ground pool. Simply put, the halogen generator in accordance with this invention is so simple that virtually anyone can attach it to an above ground pool, without the need for expert assistance.

A sub-housing 40 is located at the intake 32 of the housing 30. The sub-housing 40 defines internal slide rails 42. The housing includes a shunt 50 for opening and closing the flow of water to the housing 30. In one exemplary embodiment the shunt 50 exists in a normally closed position. In another exemplary embodiment the shunt 50 exists in the normally open position allowing water to flow through the housing 30. In the latter embodiment, the shut would include a locking member to lock the shunt in the closed position as needed. Such a locking member is not shown herein and is believed to be known in the art.

Within the hollow space of the housing 30, an electrolytic cell 60 is located. The cell 60 is connected to the housing 30 in any number of conventional ways. For example, a plug and socket connection is used in one exemplary embodiment. Other exemplary embodiments include a hard wire from the cell, through the housing and then to a control module.

An end cap 70 fits over the end of the housing 30. The end cap 70 seals the housing from harmful environmental effects. However, the end 70 simply screws onto the housing and requires no special tools or skills to complete the assembly of the halogen generating device 20. As will be appreciated more fully below, electrical power may be necessary to for activation of the electrolytic cell. The ends of the electrolytic may be exposed through the end plate to define a plug for connection with an electrical source as shown clearly in FIGS. 1 & 2.

Figure 3:
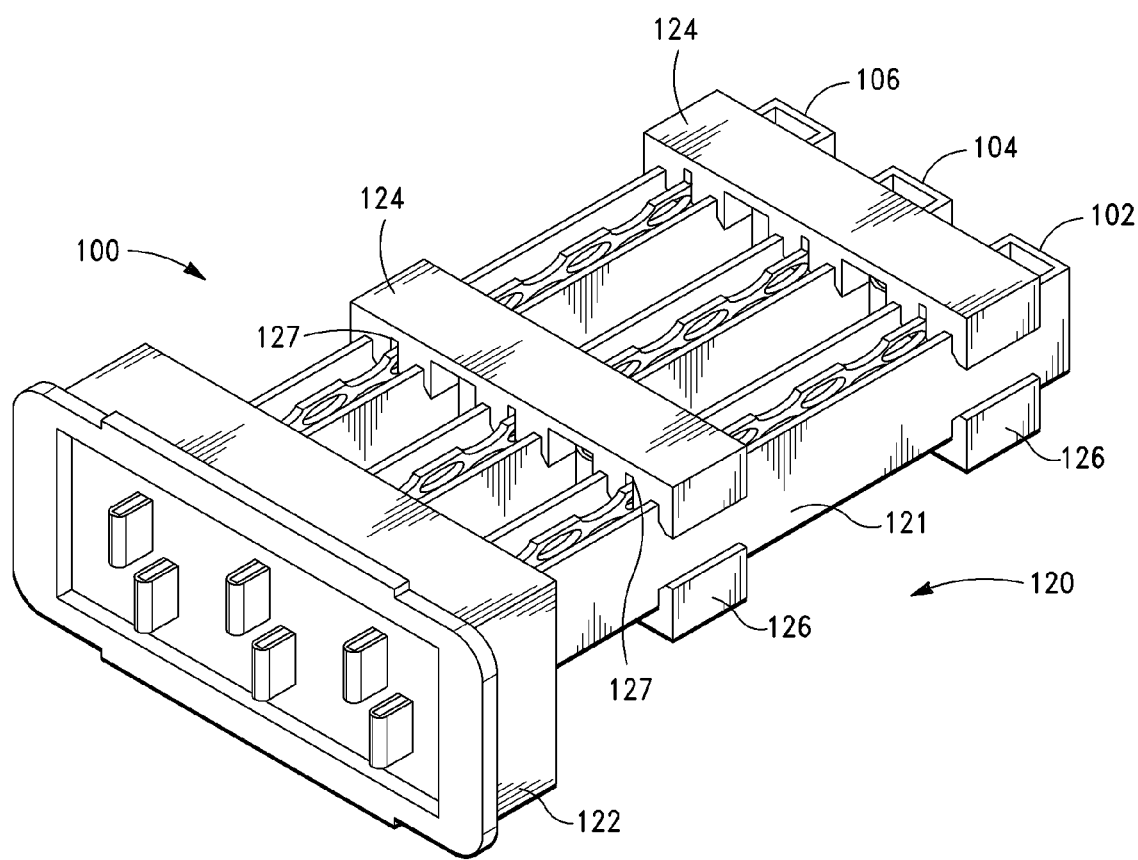
FIG. 3 is an assembled perspective view of a stacked electrolytic cell as used in FIG. 1, in accordance with this invention.
Figure 4:
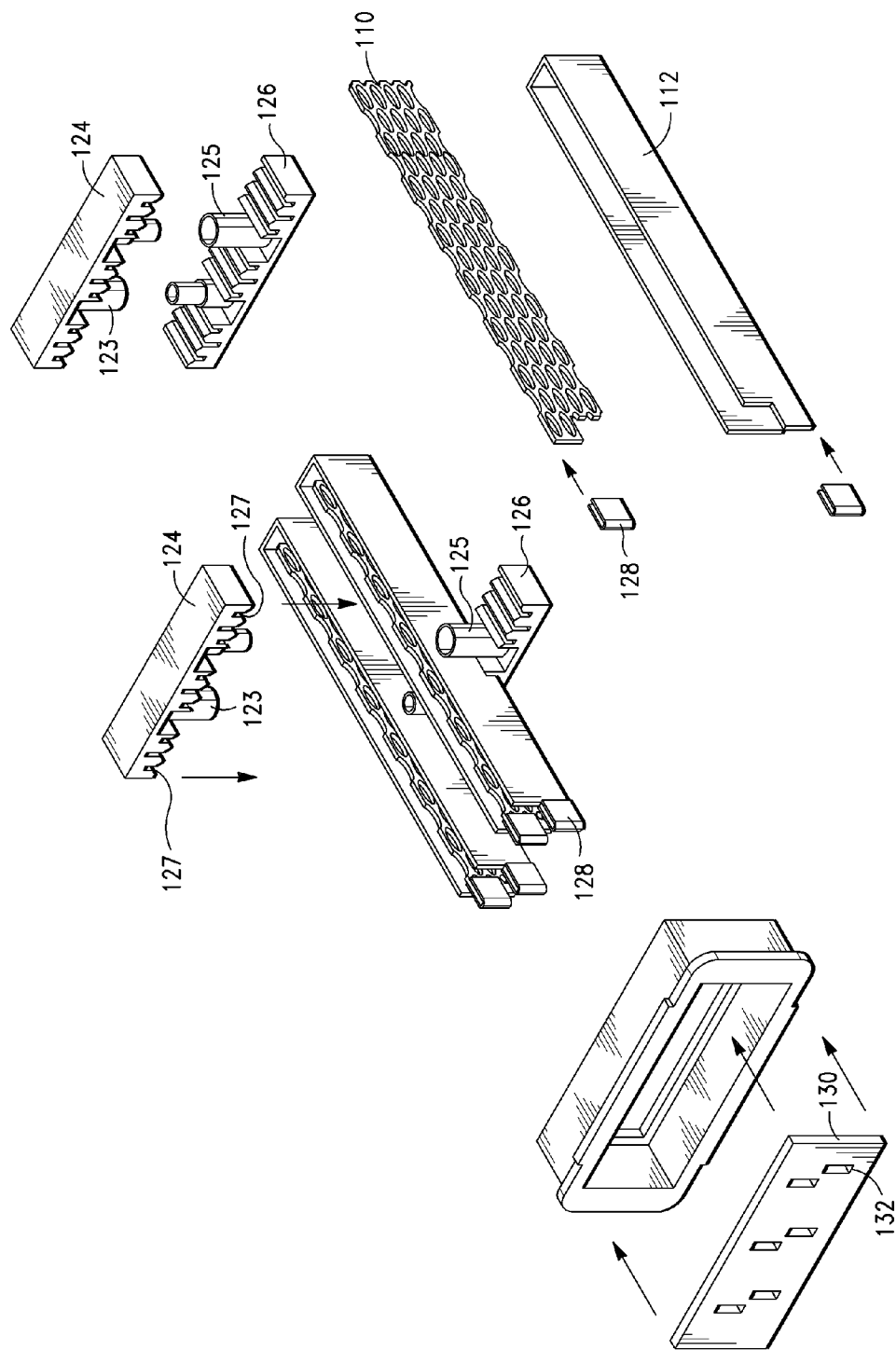
FIG. 4 is an exploded perspective view of the stacked electrolytic cell as used in FIG. 1.

With particular reference to FIGS. 3 & 4, there is shown an exemplary embodiment of the electrolytic cell 100 in accordance with this invention. Illustrated is a three cell embodiment. In other words, this embodiment has three electrolytic cells 102 104, and 106. Each of the cells having two electrodes, an anode 110 and a cathode 112. Here, the cathode 112 is U-shaped, while the anode 110 defines a mesh plate. It will be appreciated that each of the cells 102, 104 and 106, as shown in illustrated embodiment, is identical. This not necessary nor is it required to complete the invention.

The electrolytic cell 100 includes a electrolytic cell module, shown generally by the numeral 120. The module includes a frame 121 includes a base 122 and top and bottom racks, 124 and 126 respectively. Each electrode is sandwiched by the racks 124 and 126 and secured thereto by groves 127 in each of the top and bottom racks, 124 and 126, respectively. Each of the racks 124 and 126, respectively includes locking members 123 and 125, which are force fit with one another. While the locking members 123 and 125 are removable, they provide more than adequate means for securing the electrodes in place within the frame 121.

Each of the electrodes has an end and an electrically conductive end cap 128 fits over each respective end of the electrode. Thus, in the case of the U-shaped cathode 112, there are two ends, each requiring an end cap 128.

The frame base 122 includes an end plate 130 having openings 132. Each of the end caps fits within an opening 132. The end caps 128 are electrically conductive in the embodiment illustrated. In combination with the end plate 130, the end caps 128 define a plug for connection to an electrical source.

With the shunt 50 in the closed position, water is prevented from entering the housing 30. Thus, if necessary, the electrolytic module may be replaced or fixed or even adjusted without interrupting the installation of the halogen generator with the above ground pool. Additionally, the hollow interior of the housing 30 may be cleaned and inspected with no special skills or tools needed.

While the foregoing detailed description has described several embodiments of the halogen generator for an above ground pool in accordance with this invention, it is to be understood that the above description is illustrative only and not limiting of the disclosed invention. Thus, the invention is to be limited only by the claims as set forth below.

What is claimed is:

1. A halogen generating module including an electrolytic cell having two electrodes, an anode and a cathode for generating halogen in an electrolytic solution, comprising:

a frame having a base and engagement members, the engagement members for securing the electrodes to the frame and the base having openings for the electrodes; the engagement members include top and bottom racks for securing the electrodes to the frame, the engagement members being lockable and releasable and additionally the engagement members having groves for mating engagement with the electrodes;

at least one electrolytic cell including two electrodes, an anode and a cathode, each electrode end having an electrically conductive end cap, the end cap sized and shaped for insertion through the end plate opening, the cathode defines a U-shaped cathode having two ends and wherein the anode fits between the U of the cathode and the anode has a single end;

upon assembly, the combination of the end caps and base defining an electrically conductive plug.

2. A halogen generating module, as set forth in claim 1, wherein there are a plurality of electrolytic cells.

3. A halogen generating module, as set forth in claim 1, wherein there are three electrolytic cells and the combination of the conductive ends and the base for an electrically conductive plate.

* * * * *